J. R. MILLWARD.
ADVERTISING DEVICE.
APPLICATION FILED APR. 8, 1914.

1,217,979.

Patented Mar. 6, 1917.
2 SHEETS—SHEET 1.

Witnesses:

Inventor
J. Roscoe Millward

J. R. MILLWARD.
ADVERTISING DEVICE.
APPLICATION FILED APR. 8, 1914.
1,217,979.
Patented Mar. 6, 1917.
2 SHEETS—SHEET 2.
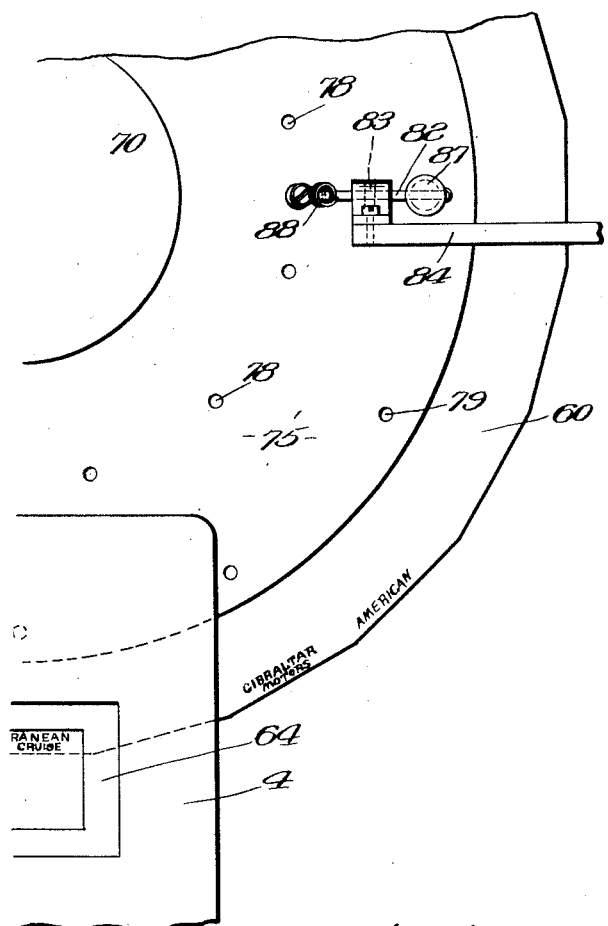
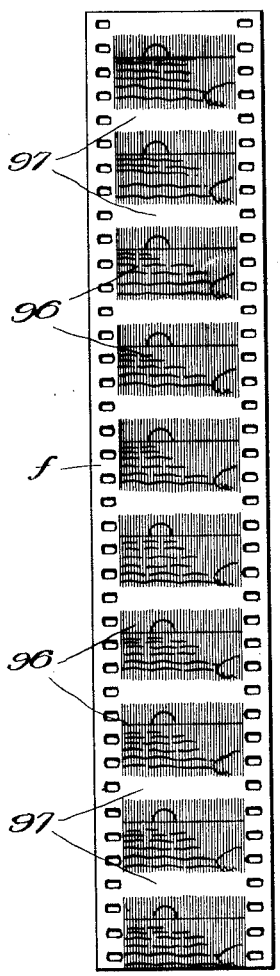
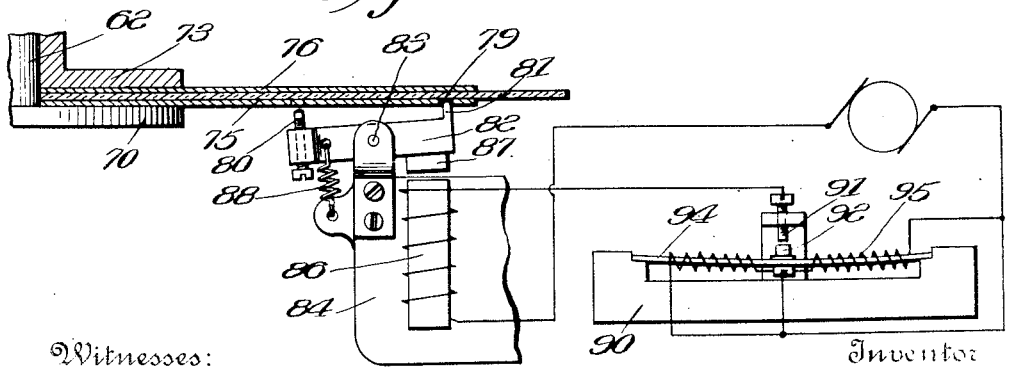

UNITED STATES PATENT OFFICE.

JOHN ROSCOE MILLWARD, OF NEWARK, NEW JERSEY.

ADVERTISING DEVICE.

1,217,979.     Specification of Letters Patent.     Patented Mar. 6, 1917.

Application filed April 8, 1914. Serial No. 830,412.

*To all whom it may concern:*

Be it known that I, JOHN ROSCOE MILLWARD, a citizen of the United States, residing at Newark, in the county of Essex and State of New Jersey, have invented new and useful Improvements in Advertising Devices, of which the following is a specification.

This invention relates to advertising devices and its characteristic feature of attraction is the display of photographic pictures of natural scenes of an animated and recurrent nature so as to present to the vision a continued impression similar to that of viewing the actual scene. As the pictures employed are photographs taken from the original subject the effect produced is most realistic.

In obtaining a continuous realistic effect my invention contemplates the successive reproduction of photographs of recurring natural effects such as produced by a continuous flow of water in a brook or waterfall or the wave movement of a field of grain or of the ocean waves and surf or other like motion which in nature is continuous and recurrent. The pictures thereof are projected successively upon a screen in the proper order of progression to give the effect of natural continued motion and to this end I employ a continuously driven cinematograph projecting machine provided with a continuous, endless film having a succession of photographs of the character described in the proper relation, one to the other and the last picture to the first, so as to produce the effect of continued and unbroken natural motion. The desired effect is obtained by taking a rapid succession of photographs of the subject with a motion picture camera and forming a continuous film of suitable length to permit of its being continuously driven and wherein the last picture or series of pictures is matched up with the first so as to agree in progression to give the effect of continued motion.

Additional features of my invention consist in the display of advertising characters associated with the motion pictures so produced; in means for simultaneously projecting advertising matter by means entering into a portion of the field of the projecting rays and means periodically to change the advertising matter so projected.

Figure 1:
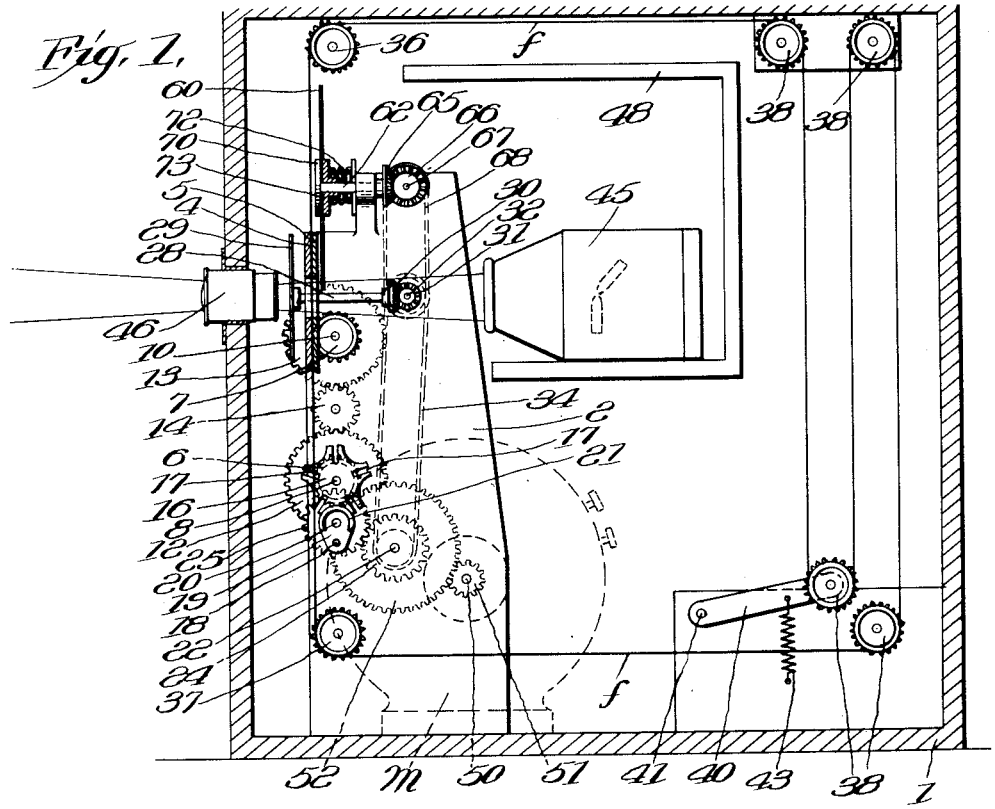
Figure 2:
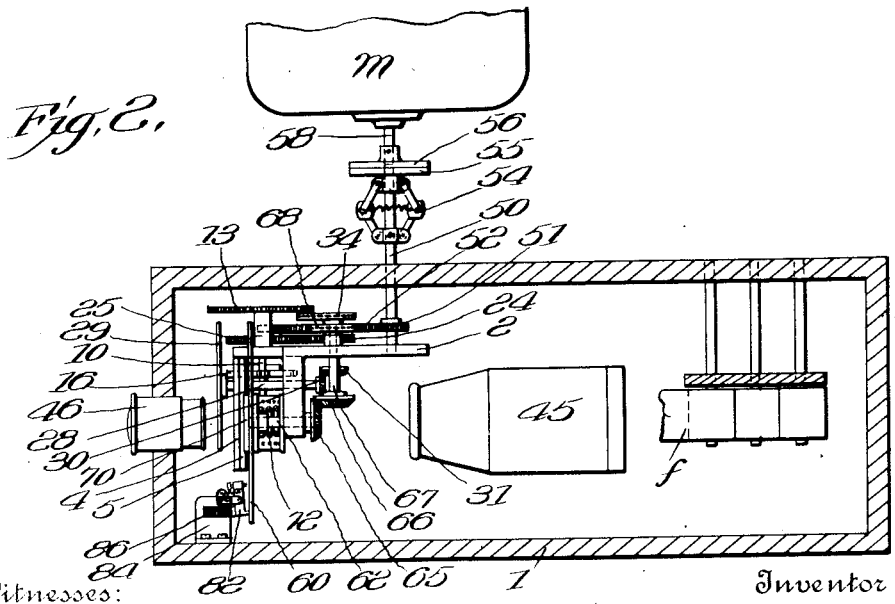

These and other features of my invention are illustrated in the accompanying drawings wherein the reference characters of this description are applied to like parts in the several views. Therein Figure 1 illustrates, in side elevation, a motion picture projecting machine embodying the requisite features to operate in accordance with my invention. Fig. 2 is a plan view thereof. Figs. 3 and 4 are detail views, respectively in front elevation and in plan, of certain features of the embodiment of my invention shown and Fig. 5 is a diagrammatic illustration of the film of my invention composed of pictures arranged to agree in a continuous progression to produce the characteristic effect described.

In the drawings I have illustrated the general features of a motion picture projecting machine adapted to operate upon the customary type of apertured film intermittently to feed the film to bring the pictures thereon successively into the path of the projecting rays from a suitable lens; the rays being intercepted or shut off by a suitable shutter during the feed movements of the film.

The machine, as shown, is inclosed in a suitable fireproof container or box 1 and consists of the usual supporting frame 2 for the film carrying parts and having supported thereon the usual film trap 4 and film trap door 5 for supporting the usual aperture frame and guiding the film with relation thereto. Feed sprockets 6 and 7 are suitably journaled thereon and operated for the feeding of the film across the lens field with intermittent feed movements. To that end, the shafts 8 and 10 upon which the respectived sprockets are mounted are provided on their inner ends with gears 12 and 13 connected, through intermediate journaled gear 14, to rotate together for the feeding of the film. To impart the intermittent movements to the sprockets the sprocket shaft 8 has secured thereon the star wheel 16 having therein equally spaced radial grooves 17 to be engaged by a pin 18 of an operating crank 19 on a crank shaft 20. The operating crank 19 has a curved flange 21 thereon to engage complemental surfaces of the star wheel to form a lock for locking of the star wheel in its respective positions. The pin 18 will engage a groove of the star wheel upon each revolution of the crank 19 to rotate the sprockets a fifth of a turn or the distance of four teeth; the sprockets each being provided with twenty teeth in circumferential arrangement to engage correspondingly spaced apertures in the film *f*. The film, as shown, is endless with a picture to each four apertures and the total number of apertures to the film length is a multiple of the number to the picture so that upon continuously driving the sprockets through the star wheel the pictures will be brought into the field of the projecting rays in continuous successive manner.

The driving movement is transmitted to the crank shaft 20 from a driving shaft 22, journaled in the frame 2, by the engagement of similar gears 24—25 carried by the crank shaft 20 and drive shaft 22 respectively. A similar movement is transmitted from the drive shaft to a shutter shaft 28 suitably journaled and having thereon the usual shutter 29 to cut off the projecting rays during the feeding of the film. To that end the shutter shaft is provided on its inner end with a bevel gear 30 engaging a similar gear 31 on a shutter drive shaft 32. The drive shaft 22 and the shutter drive shaft have similar sprocket wheels thereon carrying a shutter drive chain 34 whereby movement is given to the shutter corresponding to the operation of the crank 19.

The film *f*, which has its ends joined to form a continuous or endless film, is engaged by the feed sprockets 6 and 7 to be fed through the film trap. Upper and lower supporting sprockets or idlers 36 and 37 are arranged in vertical alinement with the film trap and over them the film is passed and thence carried rearwardly to be there supported by suitable idlers 38. A number of idlers 38 are provided proportionate to the length of film to be supported. While four rear idlers are here shown it will be readily understood that the number may be increased or the distance between them be increased to support a greater length of film. Desirably one of the idlers 38 is supported upon an arm 40, journaled at 41 and held under the influence of a spring 43 to produce a tension on the film.

The projecting lantern 45 is suitably supported in the usual manner to project a ray of light through the film and the usual projecting lens 46 onto the screen where the image is shown. The lantern may desirably be contained within an inner box 48.

For the continuous driving of the machine a power shaft 50 is suitably journaled and provided with a driving pinion 51 meshing with a drive gear 52 on the machine drive shaft 22. Rotatively secured on the power shaft, under the influence of a suitable governor 54, is a friction disk 55 adapted frictionally to engage a driving disk 56 carried on the shaft 58 of an electric driving motor M.

A further feature of the present invention consists in simultaneously projecting advertising matter upon the screen and means whereby the subject matter thereof may periodically be changed. To this end I have positioned a transparent sign plate to extend into a portion of the field of the projected rays and to be there provided with transparent characters of an advertisement upon an opaque background or vice versa. As here shown the sign plate is in the form of a dial 60 arranged to be supported upon a dial shaft 62 journaled in the frame 2. It is positioned immediately to the rear of the aperture frame with its lower edge extended into the field of the projected rays as best shown in Fig. 3, where 64 indicates the usual aperture frame carried in the film trap. Upon the inner end of the dial shaft it is provided with a miter gear 65 in mesh with a similar gear 66 on a suitably journaled dial operating shaft 67 and upon the shaft 67 and the shutter operating shaft 32 are arranged similar sprockets carrying the dial drive chain 68. The dial shaft 62 is thus continuously rotated from the shutter operating shaft. It is arranged, however, that the dial shall be rotated only at predetermined intervals and that the movement thereof shall be only sufficient to bring into the field a succeeding sign portion of the dial.

The intermittent, step by step, rotation of the dial is accomplished by the arrangement whereby it is journaled upon the dial shaft to be driven by frictional engagement only and held against rotation during periods of desirable duration for the display of the advertising matter. The dial shaft is provided on its end with a friction disk 70 and the dial 60 is forced into frictional engagement therewith by the action of spring 72 pressing against a slidably mounted disk 73 as the dial is interposed between the two disks. As best shown in Figs. 3 and 4 the transparent dial plate is held between metallic supporting plates 75—76 and it is provided on its edge with equally spaced transparent sign portions as indicated in Fig. 3 where the lettering is shown of several signs (but reversed for the sake of clearness). Associated with each sign portion or section of the dial is an aperture in the plate 75 arranged centrally with respect to the signs but being alternately arranged in an inner and an outer circular plane to form inner and outer series of apertures concentric to the axis of rotation of the dial. These apertures, inner 78 and outer 79, are alternately engaged by detents 80 and 81 of a rocking escapement arm 82 pivotally supported by pin 83 on a suitable support 84 secured to the box 1. The escapement is operated by the influence of an electromagnet 86, supported on the member 84, adapted to rock the escapement in one direction by the attraction of its armature 87, carried on the escapement, when it is energized. When not so attracted the escapement arm is rocked in the opposite direction by the action of the retractile spring 88 secured to the escapement and to its support. The engagement of the detents with the apertures will hold the dial stationary during the period of each engagement and upon the rocking of the escapement to withdraw the detent the dial will be released to be rotated by the frictional engagement of the disks 70—73 until the succeeding alternately arranged aperture is engaged by the opposite detent which is then rocked into engagement. Thus the dial is intermittingly moved to bring the successive signs into position for display.

A desirable method of energizing the magnet 86 is here shown and consists of a thermal circuit interrupter or flasher arranged in series with the magnet coil. It consists of a base 90 upon which is supported the stationary contact 91 arranged to be adjustable and to be engaged by a movable circuit closing and breaking contact 92 supported upon a bar of expansible metal 94 wound with a heating coil 95 to be in series arrangement with the magnet when the circuit is closed. As shown, the bar 94 is curved downwardly and is arranged with its ends abutting shoulders on the base 90 so that expansion of the bar lengthwise will cause the central portion thereof, and consequently the contact 92 likewise, to be moved downwardly away from contact 91 to break or open both the main circuit of the magnet and of the coil 95. Upon cooling of the bar a reverse operation occurs as the bar shortens and tends to straighten out causing the central portion thereof to rise and bring the contacts again into engagement when the current will flow through both the coil 95 and the main circuit wire which are connected in parallel to the contact 92. Thus separation of the contacts 91—92 will open the circuit flowing through both the magnet and the coil 95. The operation thereof is to effect closing of the contacts 91—92 to energize the magnet when the bar 94 is cooled thereby to rock the escapement to withdraw the outer detent to release the dial and to rock the inner detent into engagement with the succeeding aperture. This action takes place against the influence of the spring 88 which is overcome by magnet but which effects a reverse movement of the escapement arm upon breaking of the magnet circuit which occurs when the bar 94 is heated by the current flowing through the magnet. Thus the escapement arm is periodically rocked in a reverse manner successively to release the dial to be moved into a succeeding position to change the sign.

In accordance with a further feature of the invention a portion of the film intermediate the pictures and coinciding in operative position with the sign portions of the advertising plate may desirably be made more transparent or clear to permit the projecting rays passing therethrough to display the advertising. This feature is clearly illustrated in Fig. 5 of the drawing wherein is shown, merely for the purpose of illustration, a strip of film having pictures thereon in proper sequence to produce the characteristic effect of my invention. The scenes there disclosed are arranged to produce the effect of an ocean view and illustrate the feature of harmonizing the last photograph (or series of photographs) with the first so as to agree in progression; the top picture indicating the first and the bottom picture indicating the last photograph. As there indicated, I have arranged for the natural representation of the recurrent and progressive motion of the waves by actual photographs thereof which in effect is most realistic.

This continuous realistic effect is obtained by the selection from a length of picture film of a section thereof wherein the pictures at the end harmonize substantially with the first pictures so that by joining of the ends and displaying in the manner described a continuous unbroken effect is produced. Obviously the intermediate photographs of the film will portray a natural and continuous motion and may be of any desirable length.

In Fig. 5, the photographs are indicated at 96 with intermediate blank, or more transparent, portions 97 to permit the passage of projecting rays for the display of the advertising matter. Or if it is desired to associate the pictures with a single advertisement, not projected by the rays, the advertisement may be positioned upon the screen (not shown) or otherwise in the field of the rays from the transparent blank portions 97.

Obviously the described arrangement is subject to various modifications without departing from the broader scope of the invention. For instance, the advertising matter may be illuminated very effectively by a portion of the photographic field of the picture itself such as the usually lighter sky portion and, furthermore, the characters of the advertisement may be partially transparent to show up in shadow effect upon a portion of the picture projected. The animated sign or display thus produced is comparatively inexpensive and most realistic in the effect produced. The photographic display thus produced is particularly suitable for outdoor night display for instance with the screen upon which the pictures are projected arranged upon the side of a city building. Furthermore, it is entirely automatic in operation; running continuously upon turning on the current of the motor by which it is driven at a desired speed as determined by the governor 54. Moreover, the films may be changed from time to time to present different scenes as the feature of attraction.

Having described my invention, I claim:

1. A device of the character described having in combination, a cinematograph projecting machine, a continuous film carried thereby, a series of photographs thereon of a subject having natural substantially recurrent movement and said photographs being arranged to agree in continuous progression, means for continuously operating the projecting machine to produce a continued realistic display and advertising matter associated with the display so produced.

2. An advertising device of the character described having in combination, a cinematograph projecting machine, a continuous film carried thereby, a series of photographs thereon of a subject having natural substantially recurrent movement and said photographs being arranged to agree in continuous progression, means for continuously operating the projecting machine to produce a continued realistic display and advertising matter arranged simultaneously to be displayed by the rays from the projecting machine.

3. An advertising device of the character described having in combination, a cinematograph projecting machine, a continuous film carried thereby, a series of photographs thereon of a subject having natural substantially recurrent movement and said photographs being arranged to agree in continuous progression, means for continuously operating the projecting machine, an advertising plate extended into the field of the projecting rays for displaying advertising thereon and said film being provided with blank portions positioned to coincide with the advertising matter when in projecting position.

In testimony whereof I have signed my name to this specification in the presence of two subscribing witnesses.

JOHN ROSCOE MILLWARD.

Witnesses:
 A. F. SASSEEN,
 M. L. BRESLIN.